(12) United States Patent
Yoder et al.

(10) Patent No.: US 10,371,447 B2
(45) Date of Patent: Aug. 6, 2019

(54) REFRACTORY ANCHOR ASSEMBLY

(71) Applicant: EXXONMOBIL RESEARCH AND ENGINEERING COMPANY, Annandale, NJ (US)

(72) Inventors: Patrick L Yoder, Montgomery, TX (US); Christopher John Fowler, Houston, TX (US); Aaron M. Schlett, Conroe, TX (US); Laura E. Johnsen, Spring, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 15/964,460

(22) Filed: Apr. 27, 2018

(65) Prior Publication Data

US 2018/0320972 A1 Nov. 8, 2018

Related U.S. Application Data

(60) Provisional application No. 62/501,998, filed on May 5, 2017.

(51) Int. Cl.
*E04B 1/24* (2006.01)
*F27D 1/14* (2006.01)
*B01J 19/00* (2006.01)

(52) U.S. Cl.
CPC .......... *F27D 1/141* (2013.01); *B01J 19/0053* (2013.01); *E04B 1/24* (2013.01); *B01J 2219/00155* (2013.01); *B01J 2219/0218* (2013.01)

(58) Field of Classification Search
CPC .......... B01J 19/0053; B01J 2219/00155; B01J 2219/0218; B01J 19/02; F27D 1/684; F27D 1/141; F27D 1/14; E04B 1/24
USPC ................................... 52/712, 378
See application file for complete search history.

(56) References Cited

U.S. PATENT DOCUMENTS

| | | | | |
|---|---|---|---|---|
| 2,840,017 | A * | 6/1958 | Wolf | F27D 1/148 110/339 |
| 3,903,341 | A | 9/1975 | Gerhold | |
| 4,651,487 | A * | 3/1987 | Nishikawa | F27D 1/141 110/336 |
| 4,660,343 | A | 4/1987 | Raycher et al. | |
| 4,680,908 | A | 7/1987 | Crowley | |
| 4,711,186 | A * | 12/1987 | Chen | B01J 19/0053 110/336 |
| 4,753,053 | A | 6/1988 | Heard | |
| 4,852,324 | A * | 8/1989 | Page | F27D 1/145 52/506.02 |
| 6,393,789 | B1 | 5/2002 | Lanclos | |
| 8,402,701 | B2 * | 3/2013 | Arteon | E04G 21/142 52/125.2 |
| 8,656,679 | B1 * | 2/2014 | Duhon | C10G 75/00 52/334 |
| 9,861,949 | B2 * | 1/2018 | Simon | B32B 3/12 |
| 2004/0229001 | A1 * | 11/2004 | Hyde | B32B 3/12 428/44 |

(Continued)

*Primary Examiner* — Beth A Stephan
(74) *Attorney, Agent, or Firm* — Glenn T. Barrett (57) ABSTRACT

An anchor assembly for anchoring refractory materials is disclosed for use in high tension stress applications. The anchor assembly includes at least one elongated plate having expansion slots formed along one edge of the elongated plate and semi-circular recessed formed along an opposing edge of the plate.

22 Claims, 7 Drawing Sheets

(56) References Cited

U.S. PATENT DOCUMENTS

2015/0147236 A1\* 5/2015 Simon ........................ B32B 3/12
   422/143

\* cited by examiner

REFRACTORY ANCHOR ASSEMBLY

CROSS-REFERENCE TO RELATED APPLICATIONS

This application claims priority to U.S. Provisional Application Ser. No. 62/501,998 filed May 5, 2017 which is herein incorporated by reference in its entirety.

BACKGROUND

Field

The presently disclosed subject matter relates to an anchor assembly for securing a refractory lining to a vessel wall. In particular, the presently disclosed subject matter relates to a large sized refractory anchor assembly for use in anchoring a monolith refractory liner.

Description of Related Art

Refractory liners have been used for many years in process vessels, reactors, conduits, furnaces and the like to provide thermal insulation and in environments such as fluidized catalytic reactors, regenerators, or stacks, to provide resistance to abrasion and erosion, which are typically operated at elevated temperatures. Refractory liners not only serve to thermally insulate a vessel, but also prolong the useful life of the vessel by shielding it from erosion and abrasion. Monolithic refractory liners generally require some form of anchoring to the metal shell/casing to secure and retain the lining. It is well known that the brittle nature of refractory/ceramics lining leave them susceptible to damage due to tension forces which will damage and crack the refractory lining leading to failure or loss in effectiveness.

Traditional refractory anchor assemblies are wire or rod based construction that are welded directly the vessel. These anchor assemblies come in many different shapes and sizes but the most common are referred to as "v-anchors" and "y-anchors" which are self-descriptive in terms of geometric profile. This type of anchor assembly is sufficient on simple flat or large radius surfaces in which there are low tension forces on the brittle refractory lining. These anchor assemblies alone are not sufficient for use in areas within the vessel that may be subject to higher tension forces. These areas include but are not limited to angled surfaces, corners or turns.

Figure 1:
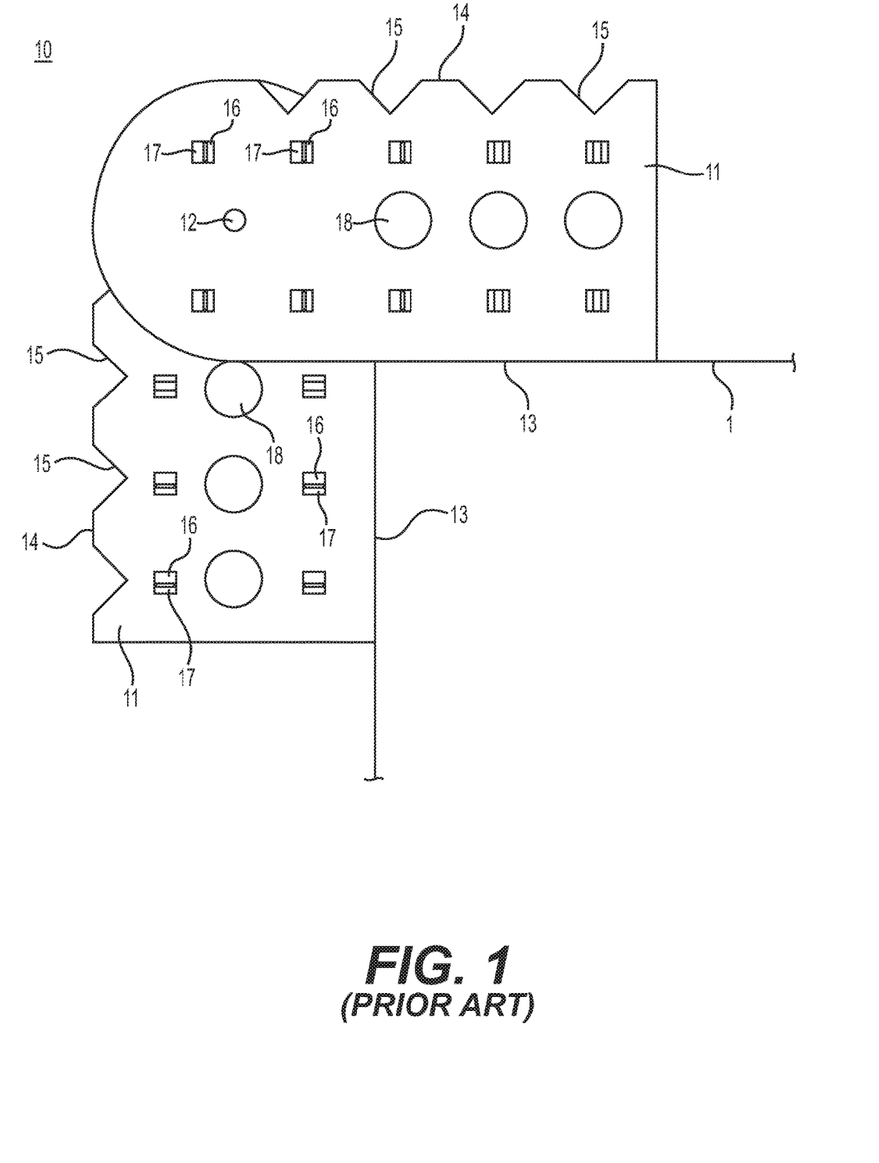
FIG. 1 is a prior schematic view of a base pin assembly of the refractory anchor assembly in accordance with one aspect of the present invention.

A conventional anchor assembly is illustrated in FIG. 1 is used for higher tension force applications. The conventional anchor assembly 10 includes a pair of pivotally connected plates 11. The plates 11 pivot about a pivot connection 12 such that the anchor assembly can be located at a corner or other angled surface within the vessel. Each of the plates includes a solid edge 13 that is adapted to be positioned against a vessel wall 1 and secured thereto by welding. The edge contacting the vessel wall may be referred to as the cool face. The plates 11 also include an outer edge 14 or hot face is located closer to the hotter interior of the vessel. The outer edge 14 includes a plurality of V-shaped notches 15 or teeth. Each plate 11 includes a plurality of square tabs 16 formed therein. The square tabs 16 are pressed from the plate forming adjacent openings 17. Additional openings 18 are provided. We use controlled engineer expansion slots (width, length, drill stop) on the hot face as oppose to large saw teeth. The large teeth are prone to refractory failure along the surface and not as reliable. These engineered slots help prevent warpage of the steel on the hot face while allow for reliable refractory performance with reduce cracking and spalling (surface loss) of refractory.

The conventional anchor assembly illustrated in FIG. 1 has several drawbacks. The temperature differential between the hot face and the cold face may result in expansion and contraction of the anchor assembly. When such expansion occurs, the V-shaped notches 15 may result in the formation and propagation of cracks in the refractory material in the area adjacent the notches. This may also result in the formation of spalling planes resulting in layers of the refractory lining breaking off from the lining. Like the V-shaped notches 15, the angular construction of the square tabs 16 may result in the formation of stress cracking around the edges of the tabs. The propagation of these cracks can again result in the failure of the refractory lining. The solid edge 13 adjacent the vessel wall may result in the formation of voids or pockets in the refractory lining when the refractory material is applied to the vessel wall. The voids or defects may lead to future failures in the refractory lining.

There is a need for a refractory anchor assembly that overcomes the above deficiencies.

SUMMARY

An anchor assembly for anchoring refractory materials to a vessel wall within a vessel is disclosed in accordance with one aspect of the presently disclosed subject matter. The anchor assembly includes at least one elongated plate. Each of the at least one elongated plate has a pair of opposing sides, a pair of opposing ends, and a pair of opposing edges. A first opposing edge of the pair of opposing edges is adapted to be positioned against the vessel wall. The first opposing edge has a plurality of recesses formed therein that are spaced along a length of the first opposing edge. Each of the plurality of recesses preferably has a semi-circular shape. When installed, the recesses form openings for receiving refractory material to improve the connection of the refractory material to the vessel wall. A second opposing edge of the pair of opposing edges has a plurality of expansion slots formed therein that are spaced along a length of the second opposing edge. Each of the plurality of slots extends from the second opposing edge in a direction towards the first opposing edge. Each expansion slot of the plurality of expansion slots has an open end on the first opposing edge, a closed end, wherein the closed end having a width greater than the expansion slot. The closed end has a generally circular shape. Each of the plurality of slots is laterally spaced between two adjacent tabs of the plurality of tabs. The plurality of slots prevent warpage of the anchor assembly that may result due to the temperature differential between the hot face and cold face of the refractory liner. The reduction of warpage reduces the formation and propagation of cracks within the refractory liner and reduces the formation of spalling planes, which may result in layers of the refractory liner breaking off. Each of the at least one elongated plate includes a plurality of tabs spaced along a length of the plate, wherein at least one of the plurality of tabs extending from a first side of the pair of opposing sides and at least another one of the plurality of tabs extending from a second side of the pair of opposing sides. The plurality of tabs provide surfaces for contacting the refractory lining to provide additional support for securing the refractory lining to the vessel wall. The anchor assembly includes a plurality of openings formed in the plate that are spaced along the length of the plate. Each of the plurality of tabs has one of the plurality of openings adjacent thereto.

The refractory lining is received within the openings to further secure the refractory lining to the anchor assembly.

In accordance with one aspect of the presently disclosed subject matter, at least one end of the pair of opposing ends has a semi-circular end and pivot opening radially spaced from the semi-circular end with such an arrangement two elongated plates can be pivotally connected together. With such an arrangement, the anchor assembly can be located at corners, bends or other angled surfaces within the vessel to provide support for the refractory lining within the vessel.

A method for anchoring a refractory material to a vessel wall within a vessel is disclosed in accordance with one aspect of the presently disclosed subject matter. The method includes providing at least one anchor assembly, locating the first opposing edge of the at least one anchor assembly on the vessel wall such that at least a portion of the first opposing edge is in contact with the vessel wall, and securing the first opposing edge to vessel wall. When the anchor assembly includes more than one elongated plate, the method includes pivotally connecting the at least two elongated plates together, pivoting one of the elongated plates with respect to another of the elongated plate such that at least a portion of each first opposing edge is positioned on the vessel wall. The method further includes applying a refractory material to the vessel wall, such that the refractory material encapsulates the at least one anchor assembly whereby refractory material surrounds the plurality of tabs and received within at least the plurality of openings and the plurality of recesses.

The accompanying drawings, which are incorporated in and constitute part of this specification, are included to illustrate and provide a further understanding of the disclosed subject matter. Together with the description, the drawings serve to explain the principles of the disclosed subject matter.

DETAILED DESCRIPTION OF THE PREFERRED EMBODIMENT

Reference will now be made in detail to the various exemplary embodiments of the disclosed subject matter, exemplary embodiments of which are illustrated in the accompanying drawings. The structure and corresponding method of installation of the disclosed subject matter will be described in conjunction with the detailed description of the system.

FIGS. 2-8 illustrate a refractory anchor assembly in accordance with the presently disclosed subject matter for use in applications that are subject to higher tension forces.

An anchor assembly 100 for anchoring refractory materials to a vessel wall 1 within a vessel is disclosed in accordance with one aspect of the presently disclosed subject matter. The anchor assembly 100 includes at least one elongated plate 110. Each plate 110 is preferably stamped from a metal sheet. The metal sheet is preferably formed from a material that is compatible with the vessel wall so that a suitable weld between the anchor assembly 100 and the vessel wall 1 can be obtained. Each of the at least one elongated plates 110 has a pair of opposing sides 120, 130, a pair of opposing ends 140, 150, and a pair of opposing edges 160, 170.

Figure 6:
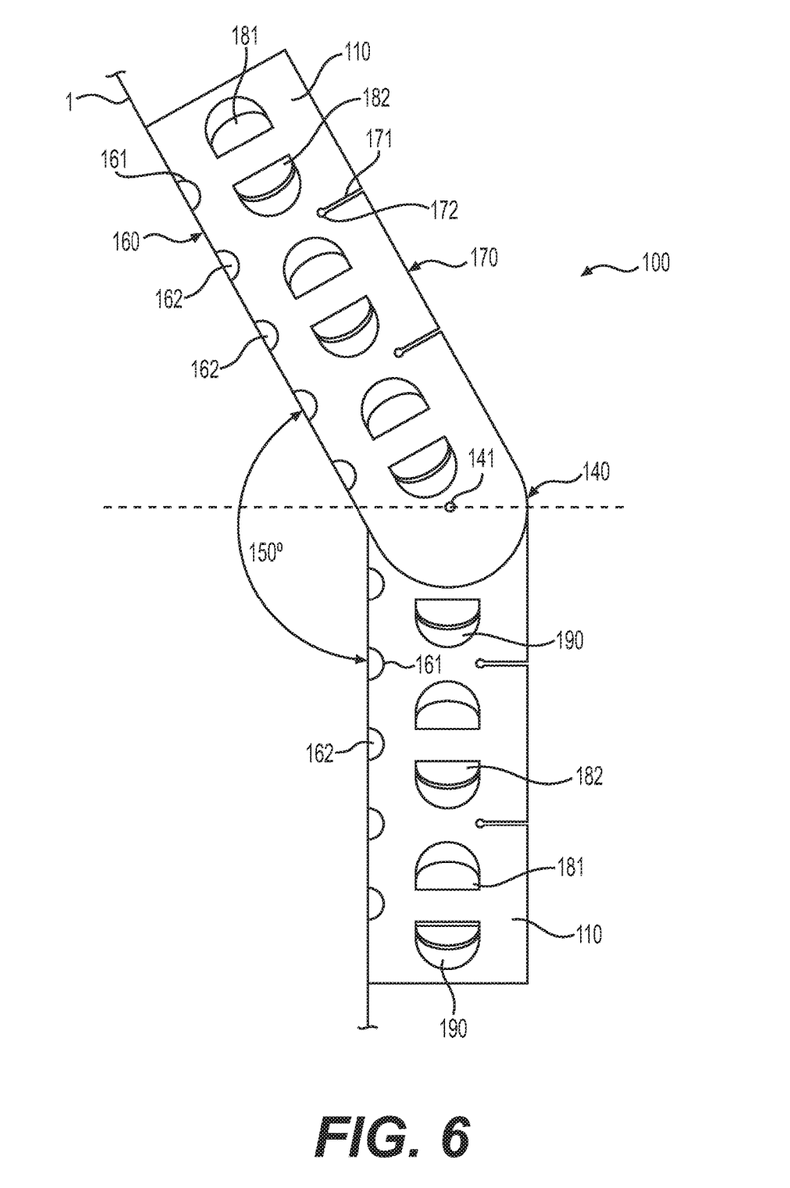
FIG. 6 is a side view of a refractory anchor assembly in one position in accordance with the presently disclosed subject matter.
Figure 7:
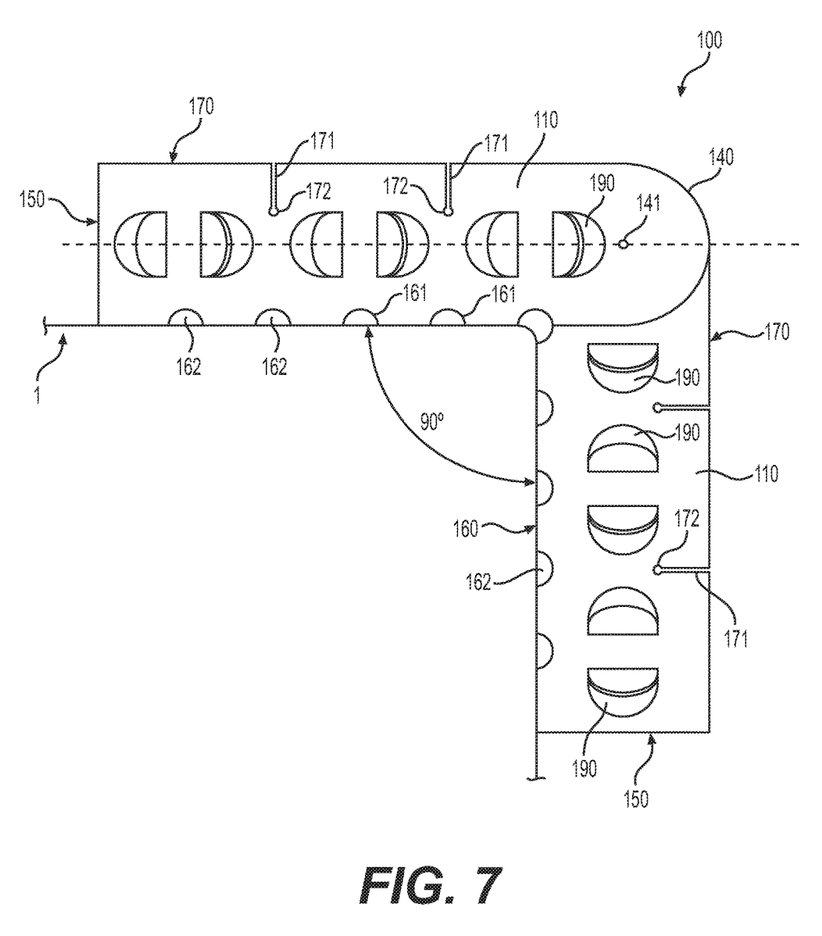
FIG. 7 is a side view of the refractory anchor assembly in another position in accordance with the presently disclosed subject matter.
Figure 8:
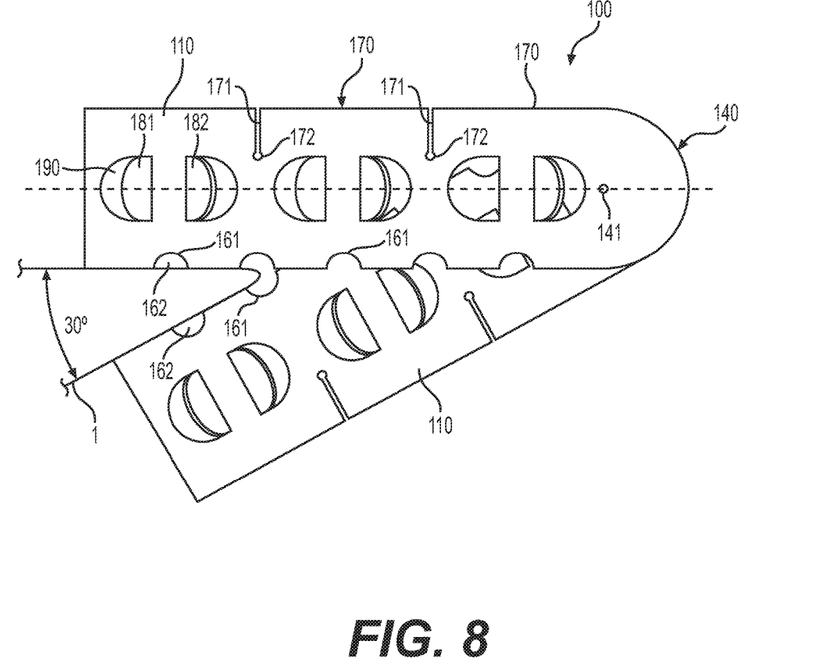
FIG. 8 is a side view of the refractory anchor assembly in yet another position in accordance with the presently disclosed subject matter.

A first opposing edge 160 of the pair of opposing edges is adapted to be positioned against the vessel wall 1. The first opposing edge or cold face edge 160 is contacts the vessel wall along at least a portion of the length of the edge such that the plate 110 can be secured, for example, by welding, to the vessel wall. The cold face edge 160 has a plurality of recesses 161 formed therein that are spaced along the length of the edge. Each of the plurality of recesses preferably has a semi-circular shape. The semi-circular or curved shape is preferable to limit the formation of stress cracks within the refractory material. As illustrated in FIGS. 6-8, when the edge 160 is secured to the vessel wall 1, the recesses 161 form openings 162 between the wall 1 and the anchor assembly. These openings 162 permit better flow of the refractory material when the refractory lining is installed. This reduces and/or eliminates the formation of voids discussed above in connection with the conventional anchor assembly 10. Additionally, the openings 162 aid in the formation of a monolithic refractory lining because the lining material not only extends around but through the anchor plate 110.

A second opposing edge 170 of the pair of opposing edges is located adjacent the hot face or process side of the refractory lining within the vessel. The second opposing edge or hot face edge 170 has a plurality of expansion slots 171 formed therein that are spaced along a length of the second opposing edge. Each of the plurality of slots 171 extends from the second opposing edge in a direction towards the first opposing edge 160. These slots 171 help prevent warpage of the metal sheet forming the anchor sheet on the hot face edge 170 when exposed to high temperatures. These slots 171 allow for reliable refractory performance with reduced cracking and spalling of refractory lining.

As illustrated in FIGS. 4-8, each expansion slot 171 has an open end on the hot face edge 170, and a closed end 172. The closed end 172 having a width greater than the expansion slot. The closed end 172 preferable has a generally circular shape. Since the metal forming the plates 110 expands at a greater rate than the refractory lining with temperature, the expansion slots are included on the hotter surface (e.g., process side) to help accommodate the metal expansion and reduce the risk of refractory damage. The slot 171 is terminated with a slightly larger hole 172 to prevent metal cracking and crack growth at the termination of the slot. The circular shape tends to dissipate stress that may develop along the slot when compared to an angular geometry. The plurality of slots prevent warpage of the anchor assembly that may result due to the temperature differential between the hot face and cold face of the refractory liner.

The reduction of warpage reduces the formation and propagation of cracks within the refractory liner and reduces the formation of spalling planes, which may result in layers of the refractory liner breaking off.

Figure 2:
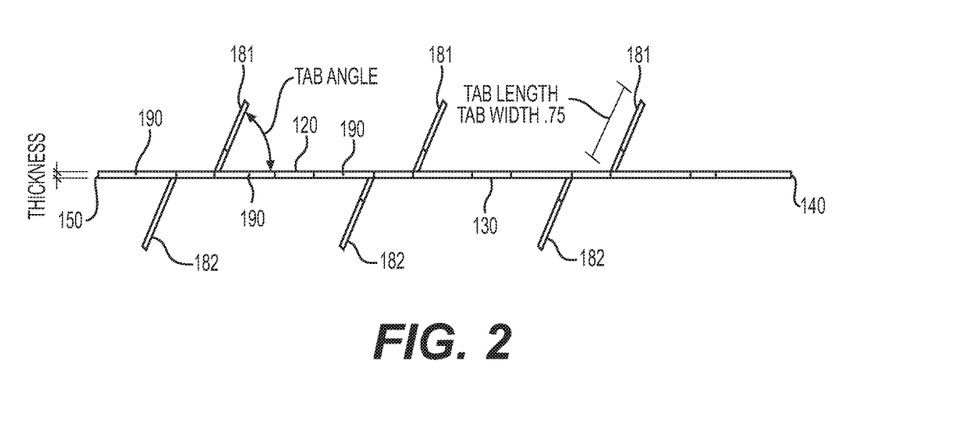
FIG. 2 is a bottom view of an anchor assembly in accordance with the presently disclosed subject matter.
Figure 3:
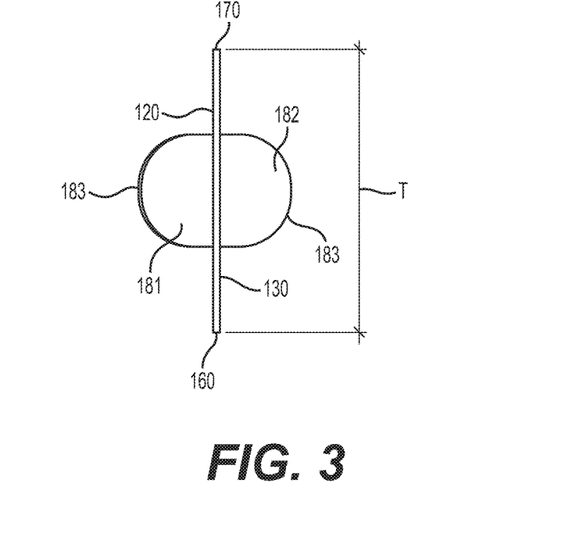
FIG. 3 is an end view of the anchor assembly in accordance with the presently disclosed subject matter.
Figure 4:
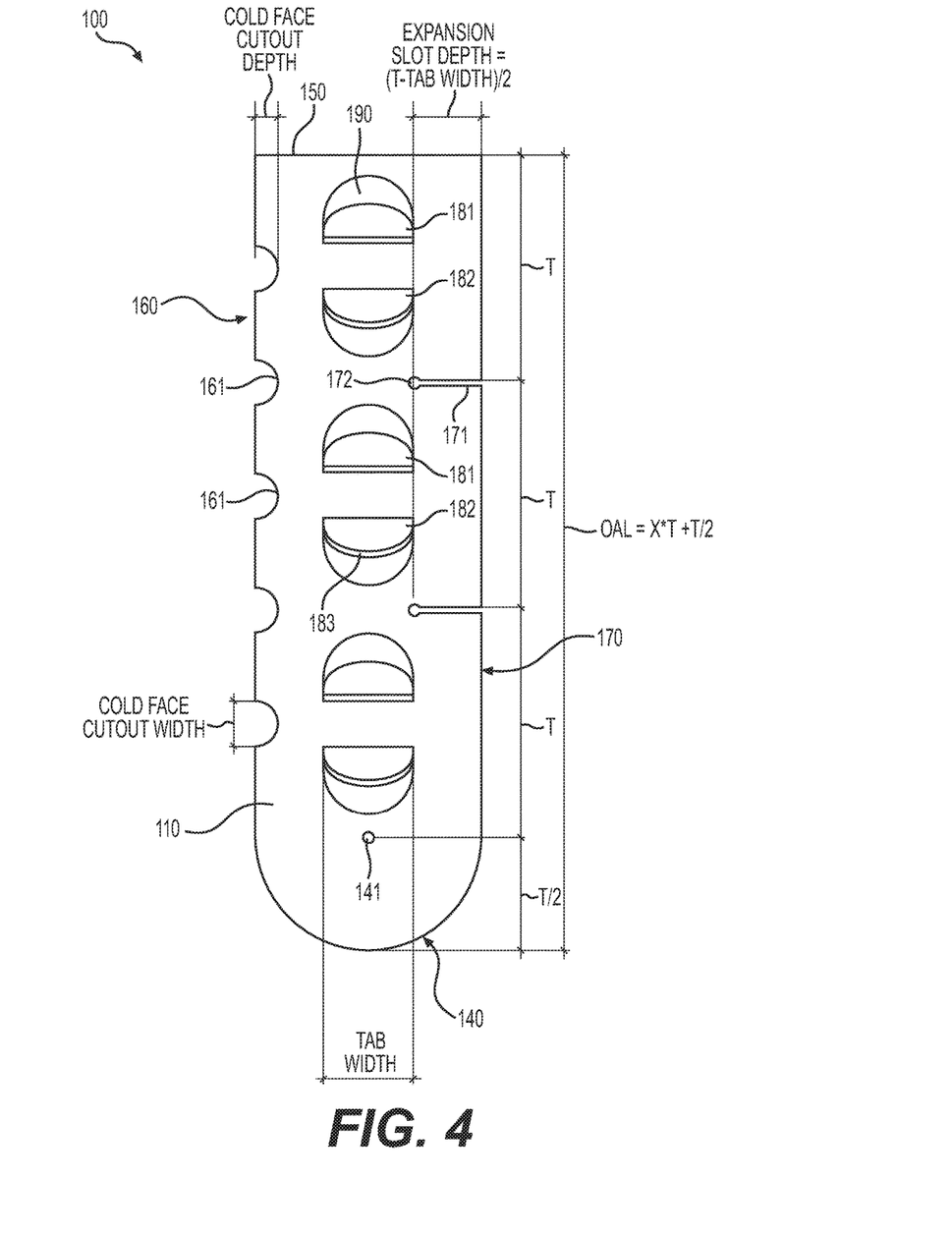
FIG. 4 is a side view of the anchor assembly in accordance with the presently disclosed subject matter.
Figure 5:
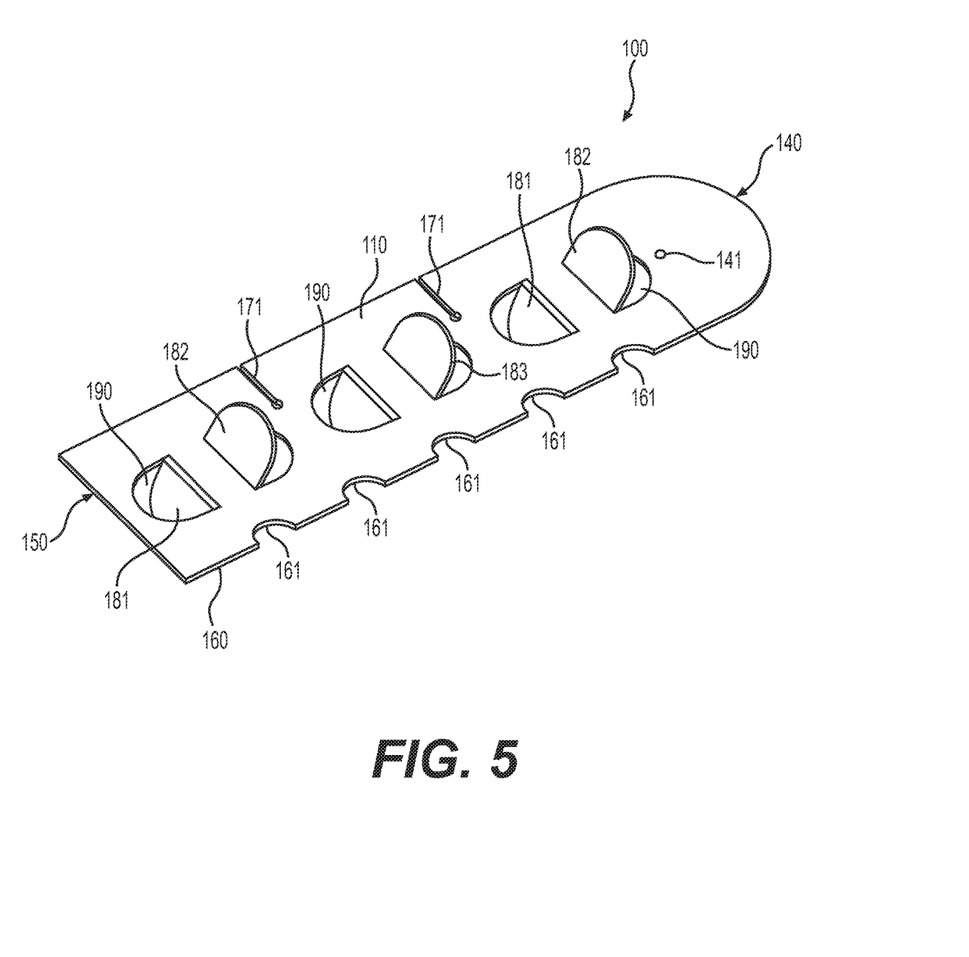
FIG. 5 is a perspective view of the anchor assembly in accordance with the presently disclosed subject matter.

Each elongated plate 110 includes a plurality of tabs 181, 182 spaced along a length of the plate. As illustrated in FIGS. 2, 3 and 5, tabs 181 extend from the first side 120 of the plate 110 and tabs 182 extend away from the second side 130 of the plate 110. The tabs 181 and 182 provide additional points of contact for securing the refractory lining to the vessel wall 1. The tabs 181 and 182 preferably have free ends 183 having a generally circular shape, which limits or prevents the formation and propagation of cracks within the refractory liner and reduces the formation of spalling planes. As illustrated in FIG. 2, the tabs 181 and 182 preferably extend at opposing angles with respect to plate 110.

The tabs 181 and 182 are preferably formed by stamping when the plate 110 is formed from the metal sheet. When the tabs 181 and 182 are bent to be angled towards the opposing sides, a plurality of openings 190 formed in the plate that are spaced along the length of the plate. Like the tabs, the openings 190 have a semi-circular configuration. The refractory lining during formation passes through the openings 190 to further secure the refractory lining to the anchor assembly 100 and the vessel wall 1.

At least one end 140 of the pair of opposing ends 140, 150 has a semi-circular end and pivot opening 141 uniformly and radially spaced from the semi-circular end. Two elongated plates 110 can be secured together, as shown in FIGS. 6-8, such that the two elongated plates can be pivotally connected together about the pivot opening 141. A suitable fastener, not shown, may be utilized to secure the components together. While an anchor assembly having a pair of elongated plates is illustrated and disclosed, the presently disclosed subject matter is not intended to be so limited; rather, it is contemplated that two or more plates 110 can be pivotally connected. When more than two plates 110 are pivotally connected, both ends 140 and 150 will have a semi-circular end with a corresponding opening. With such an arrangement, the anchor assembly 100 can be located at corners, bends or other angled high tension surfaces within the vessel to provide support for the refractory lining within the vessel.

As illustrated in FIGS. 6-8, the cold face edge 160 is positioned adjacent the vessel wall 1. With such an arrangement, at least a portion of the recesses 161 form openings 162 with the vessel wall 1. It is contemplated that not all of the cold face edge 160 will contact the vessel wall 1 depending on the pivot angle between the plates 110. As illustrated in FIG. 8, when the pivot angle is less than 90 degrees a portion of the plates 110 will overlap. With such an arrangement, one or more of the tabs 181 and 182 will need to be removed (e.g, by trimming or cutting) such that plates remain flush and are pivotable.

It is contemplated that more than one anchor assembly 100 will be utilized in high tension areas within the vessel. The anchor assemblies may be arranged in a spaced relationship such that the anchor assemblies provide sufficient means for securing the refractory lining to the vessel wall 1. It is further contemplated that one or more v-anchors or y-anchors may be mounted in the spaces between adjacent anchor assemblies 100 to provide further points for anchoring the refractory lining to the vessel wall 1. The additional anchor are intended to be limited to v-anchors and y-anchors; rather any other suitable anchor assembly may be utilized.

During installation, the anchor assemblies 100 are positioned located in desired location on the vessel wall 1. If the two or more plates 110 are utilized, the plates 110 are pivoted to the necessary angle and secured together. If necessary, one or more of the tabs 181 and 182 may be removed to such that the plates 110 can be pivoted to the desired location. Once properly located on the vessel wall 1, the cold face edge 160 is welded to vessel wall 1. The additional anchors may be added at this time. Once the anchor assemblies 100 and additional anchors (if necessary) are in place, the refractory material may be applied to form the refractory lining.

The design of the anchor assembly 100 with the above described slots and openings allows the flow of refractory material from one location to another to form a fully knitted monolithic refractory lining securely anchored to the vessels. The presently disclosed subject matter has application to the anchoring of monolith refractories including but not limited to castables, gun mixes, shotcrete/shotcast, plastic refractories, and ramming mixes. The anchor assembly 100 is designed aid in the flow of metal fiber reinforced refractory to create a continuous monolithic lining free of voids, agglomerations, air pockets and other defects

ADDITIONAL EMBODIMENTS

Additionally or alternatively, the invention can include one or more of the following embodiments.

Embodiment 1

An anchor assembly for anchoring refractory materials to a vessel wall within a vessel is disclosed. The anchor assembly includes at least one elongated plate. Each of the at least one elongated plate has a pair of opposing sides, a pair of opposing ends, and a pair of opposing edges. A first opposing edge of the pair of opposing edges is adapted to be positioned against the vessel wall. The first opposing edge has a plurality of recesses formed therein that are spaced along a length of the first opposing edge. A second opposing edge of the pair of opposing edges has a plurality of expansion slots formed therein that are spaced along a length of the second opposing edge. Each of the plurality of slots extends from the second opposing edge in a direction towards the first opposing edge. Each of the at least one elongated plate includes a plurality of tabs spaced along a length of the plate, wherein at least one of the plurality of tabs extending from a first side of the pair of opposing sides and at least another one of the plurality of tabs extending from a second side of the pair of opposing sides.

Embodiment 2

The anchor assembly according to the previous embodiment, wherein each of the plurality of recesses has a semi-circular shape.

Embodiment 3

The anchor assembly according to anyone of the previous embodiments, wherein each of the plurality of recesses is laterally spaced between two adjacent tabs of the plurality of tabs.

Embodiment 4

The anchor assembly according to anyone of the previous embodiments, further comprising a plurality of openings formed in the plate that are spaced along the length of the plate, wherein each of the plurality of tabs having one of the plurality of openings adjacent thereto.

Embodiment 5

The anchor assembly according to anyone of the previous embodiments, wherein each of the plurality of tabs having a free end, wherein the free end having a semi-circular shape.

Embodiment 6

The anchor assembly according to embodiment 5, wherein each free end extending in a direction opposite to adjacent free ends.

Embodiment 7

The anchor assembly according to anyone of the previous embodiments, each expansion slot of the plurality of expansion slots having an open end on the first opposing edge, a closed end, wherein the closed end having a width greater than the expansion slot.

Embodiment 8

The anchor assembly according to embodiment 7, wherein the closed end has a generally circular shape.

Embodiment 9

The anchor assembly according to anyone of the previous embodiments, wherein each of the plurality of slots is laterally spaced between two adjacent tabs of the plurality of tabs.

Embodiment 10

The anchor assembly according to anyone of the previous embodiments, wherein at least one end of the pair of opposing ends has a semi-circular end and pivot opening radially spaced from the semi-circular end.

Embodiment 11

The anchor assembly according to embodiment 10, wherein the at least one elongated plate includes at least two elongated plates, wherein one elongated plate is pivotally connected to another elongated plate at the pivot opening whereby the one elongated plate is pivotable with respect to the other elongated plate.

Embodiment 12

The anchor assembly according to embodiment 11, wherein the first opposing edge of one elongated plate and the first opposing edge of the other plate are adapted to be positioned against the vessel wall.

Embodiment 13

A method for anchoring a refractory material to a vessel wall within a vessel is disclosed. The method includes providing at least one anchor assembly according to any one of the previous embodiments, locating the first opposing edge on the vessel wall such that at least a portion of the first opposing edge is in contact with the vessel wall, and securing the first opposing edge to vessel wall.

Embodiment 14

The method according to embodiment 13, wherein the at least one elongated plate includes at least two elongated plates, wherein providing the at least one anchor assembly includes pivotally connecting the at least two elongated plates together.

Embodiment 15

The method according to embodiment 14, wherein locating the first opposing edge on the vessel wall further includes pivoting one of the elongated plates with respect to another of the elongated plate such that at least a portion of each first opposing edge being positioned against the vessel.

Embodiment 16

The method according to anyone of embodiments 13-15, further including applying a refractory material to the vessel wall, such that the refractory material encapsulates the at least one anchor assembly whereby refractory material surrounds the plurality of tabs and received within at least the plurality of openings and the plurality of recesses.

While the disclosed subject matter is described herein in terms of certain preferred embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments. While the presently disclosed subject matter has been described in the connection for use in vessel, it is not intended to be so limited; rather, it is contemplated that presently disclosed subject matter has application in any component that require the use of refractory linings for thermal, mechanical, and/or corrosion protection.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. An anchor assembly for anchoring refractory materials to a vessel wall within a vessel, the anchor assembly comprising:
at least one elongated plate,
wherein each of the at least one elongated plate having a pair of opposing sides, a pair of opposing ends, and a pair of opposing edges,
wherein a first opposing edge of the pair of opposing edges being adapted to be positioned against the vessel wall, wherein the first opposing edge having a plurality of recesses formed therein that are spaced along a length of the first opposing edge,
wherein a second opposing edge of the pair of opposing edges having a plurality of expansion slots formed therein that are spaced along a length of the second opposing edge, wherein each of the plurality of slots extends from the second opposing edge in a direction towards the first opposing edge, and
wherein each of the at least one elongated plate includes a plurality of tabs spaced along a length of the plate, wherein at least one of the plurality of tabs extending from a first side of the pair of opposing sides and at least another one of the plurality of tabs extending from a second side of the pair of opposing sides.

2. The anchor assembly according to claim 1, wherein each of the plurality of recesses has a semi-circular shape.

3. The anchor assembly according to claim 2, wherein each of the plurality of recesses is laterally spaced between two adjacent tabs of the plurality of tabs.

4. The anchor assembly according to claim 1, further comprising a plurality of openings formed in the plate and being spaced along the length of the plate, wherein each of the plurality of tabs having one of the plurality of openings adjacent thereto.

5. The anchor assembly according to claim 1, wherein each of the plurality of tabs having a free end, wherein the free end having a semi-circular shape.

6. The anchor assembly according to claim 5, wherein each free end extending in a direction opposite to adjacent free ends.

7. The anchor assembly according to claim 1, each expansion slot of the plurality of expansion slots having an open end on the first opposing edge, a closed end, wherein the closed end having a width greater than the expansion slot.

8. The anchor assembly according to claim 7, wherein the closed end having a generally circular shape.

9. The anchor assembly according to claim 1, wherein each of the plurality of slots is laterally spaced between two adjacent tabs of the plurality of tabs.

10. The anchor assembly according to claim 1, wherein at least one end of the pair of opposing ends having a semi-circular end and pivot opening radially spaced from the semi-circular end.

11. The anchor assembly according to claim 10, wherein the at least one elongated plate includes at least two elongated plates, wherein one elongated plate being pivotally connected to another elongated plate at the pivot opening whereby the one elongated plate is pivotable with respect to the other elongated plate.

12. The anchor assembly according to claim 11, wherein the first opposing edge of one elongated plate and the first opposing edge of the other plate being adapted to be positioned against the vessel wall.

13. A method for anchoring a refractory material to a vessel wall within a vessel, the method comprising:

providing at least one anchor assembly, wherein each of the at least one anchor assembly having at least one elongated plate, wherein each of the at least one elongated plate having a pair of opposing sides, a pair of opposing ends, and a pair of opposing edges, wherein a first opposing edge of the pair of opposing edges being adapted to be positioned against the vessel wall, wherein the first opposing edge having a plurality of recesses formed therein that are spaced along a length of the first opposing edge, wherein a second opposing edge of the pair of opposing edges having a plurality of expansion slots formed therein that are spaced along a length of the second opposing edge, wherein each of the plurality of slots extends from the second opposing edge in a direction towards the first opposing edge, and wherein each of the at least one elongated plate includes a plurality of tabs spaced along a length of the plate, wherein at least one of the plurality of tabs extending from a first side of the pair of opposing sides and at least another one of the plurality of tabs extending from a second side of the pair of opposing sides;
locating the first opposing edge on the vessel wall such that at least a portion of the first opposing edge is in contact with the vessel wall; and
securing the first opposing edge to the vessel wall.

14. The method according to claim 13, wherein each of the plurality of recesses has a semi-circular shape and is laterally spaced between two adjacent tabs of the plurality of tabs, wherein a plurality of openings are formed by the plurality of recesses when the first opposing edge is located on the vessel wall.

15. The method according to claim 13, wherein each elongated plate further comprising a plurality of openings formed in the plate and being spaced along the length of the plate, wherein each of the plurality of tabs having one of the plurality of openings adjacent thereto.

16. The method according to claim 15, wherein each of the plurality of tabs having a free end, wherein the free end having a semi-circular shape.

17. The method according to claim 16, wherein each free end extending in a direction opposite to adjacent free ends.

18. The method according to claim 13, wherein each expansion slot of the plurality of expansion slots having an open end on the first opposing edge, a closed end, wherein the closed end having a width greater than the expansion slot, and the closed end having a generally circular shape.

19. The method according to claim 18, wherein each of the plurality of slots is laterally spaced between two adjacent tabs of the plurality of tabs.

20. The method according to claim 13, wherein at least one end of the pair of opposing ends having a semi-circular end and pivot opening radially spaced from the semi-circular end,
wherein the at least one elongated plate includes at least two elongated plates,
wherein providing the at least one anchor assembly includes pivotally connecting the at least two elongated plates together.

21. The method according to claim 20, wherein locating the first opposing edge on the vessel wall further includes pivoting one of the elongated plates with respect to another of the elongated plate such that at least a portion of each first opposing edge being positioned against the vessel.

22. The method according to claim 13, further comprising:
applying a refractory material to the vessel wall, such that the refractory material encapsulates the at least one anchor assembly whereby refractory material surrounds the plurality of tabs and received within at least the plurality of openings and the plurality of recesses.

* * * * *